Patented Aug. 7, 1934

1,969,356

UNITED STATES PATENT OFFICE 1,969,356

ALKOXY-3-CARBOXY-DIPHENYL

Walter G. Christiansen, Glen Ridge, N. J., and Adelbert W. Harvey, Pittsburgh, Pa., assignors to E. R. Squibb & Sons, Brooklyn, N. Y., a corporation of New York No Drawing. Application December 23, 1932, Serial No. 648,582

9 Claims. (Cl. 260—111)

This invention relates to the preparation of 2-alkoxy-3-carboxy-diphenyls and salts thereof, and includes as new compounds 2-alkoxy-3-carboxy-diphenyls and salts thereof containing two or more carbon atoms in the alkoxy group, and more particularly, it relates to 2-ethoxy-3-carboxy-diphenyl and 2-butoxy-3-carboxy-diphenyl and their alkali metal salts.

We have found that 2-alkoxy-3-carboxy-diphenyls containing more than two carbon atoms in the alkoxy group are valuable intermediates for the preparation of local anesthetics. We have found that in the preparation of local anesthetics 2-ethoxy-3-carboxy-diphenyl and 2-butoxy-3-carboxy-diphenyl are satisfactory but the invention is not limited to these new compounds but includes as new products the lower alkoxy derivatives containing more than two carbon atoms.

The 2-alkoxy-3-carboxy-diphenyls may be prepared by etherifying and esterifying 2-hydroxy-3-carboxy-diphenyl and then saponifying the ester. The following equation indicates how this may be carried out:

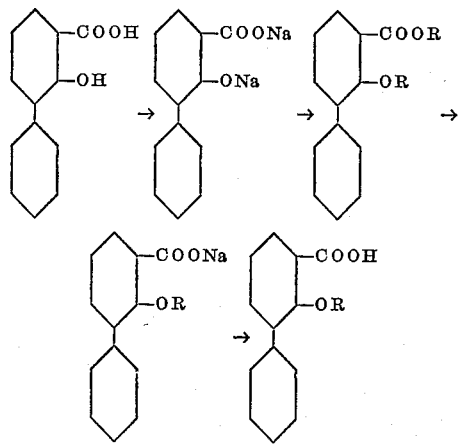

The following examples indicate how the process may be carried out:

Example 1

42.8 grams (0.2 mol.) of 2-hydroxy-3-carboxy diphenyl is converted into the disodium derivative (sodium salt and sodium phenolate) by treatment with 16 grams of sodium hydroxide and sufficient water to make a clear solution. The disodium derivative is recovered by direct evaporation and finally completely dried by heating at 105–110° C. for several hours in an oven, avoiding excessive contact with air or carbon dioxide, or more conveniently in a vacuum drying apparatus. The dry disodium compound is then treated with somewhat more than 43.6 grams (0.4 mol.) of ethyl bromide, 75 grams being a convenient amount, and heated at about 100° C., or above, for five hours in an autoclave. The excess of ethyl bromide is removed by evaporation or distillation and the residue (which consists largely of sodium bromide and the ethyl ester of 2-ethoxy-3-carboxy diphenyl) placed in water, heated for a short time and the ester-ether separated mechanically from the aqueous solution.

The free acid 2-ethoxy-3-carboxy diphenyl is obtained by saponification of its ethyl ester with sodium hydroxide and precipitation of the ethoxy acid from the resulting sodium salt by acidification with a mineral acid such as hydrochloric acid.

The compound may be filtered off, dried and purified by crystallization from a mixture of 1 part of benzene and 2.5 parts of petroleum ether. The pure material crystallizes as white needles with a melting point of 97–98° C. (corrected).

The compound is soluble in alcohol, ether, benzene, chloroform, acetone, ethyl acetate and several other organic solvents.

Example 2

21.4 grams (0.1 mol.) of 2-hydroxy-3-carboxy diphenyl is converted into the di-potassium derivative (potassium salt and potassium phenolate) by treatment with 11.2 grams of potassium hydroxide dissolved in 100 cc. of water, followed by evaporation to dryness. Final drying is conveniently carried out by placing in an over at 105–110° C. for several hours or by drying in vacuo.

The dry di-potassium compound is treated with an excess over 27.4 grams (0.2 mol.) of n-butyl bromide and heated, preferably in a closed vessel, in a bath maintained at 130° C. for five hours. After cooling, the n-butyl ester of 2-n-butoxy-3-carboxy diphenyl and excess of n-butyl bromide is filtered from the by-product sodium bromide and the excess of n-butyl bromide is removed by distillation. The residue consists principally of the n-butyl ester of 2-n-butoxy-3-carboxy diphenyl.

The free acid, 2-n-butoxy-2-carboxy diphenyl, is obtained by saponification of its n-butyl ester with dilute aqueous-alcoholic potassium hydroxide and precipitation of the free acid from its potassium salt by acidification with mineral acid such as hydrochloric acid. It is preferable to remove the greater part of the alcohol from the saponification mixture before the acid precipitation.

2-n-butoxy-3-carboxy diphenyl is soluble in alcohol, ether, benzene, chloroform and other organic solvents. It is useful as an intermediate in the preparation of local anesthetics and other synthetic derivatives.

Other alkoxy derivatives may be prepared by condensing the disodium or dipotassium derivative of 2-hydroxy-3-carboxy diphenyl with isobutyl bromide or a propyl or amyl bromide, etc.

We claim:

1. A method of preparing 2-alkoxy-3-carboxy-diphenyls which comprises converting 2-hydroxy-3-carboxy-diphenyl to its di-alkali-metal salt, treating this with two mols. of an alkyl halide to form the alkoxy derivative of the alkyl ester of 3-carboxy-diphenyl, saponifying the ester and then acidifying.

2. The method of preparing an alkali metal salt of 2-alkoxy-3-carboxy-diphenyl from 2-hydroxy-3-carboxy-diphenyl which comprises first forming the di-alkali-metal derivative, treating this with two mols. of an alkyl halide to form the alkoxy derivative of the alkyl ester and then saponifying the ester with an alkali metal hydroxide.

3. The method of preparing an ether of the alkyl ester of 2-hydroxy-3-carboxy-diphenyl which comprises treating the di-alkali-metal derivative of 2-hydroxy-3-carboxy-diphenyl with two mols. of an alkyl halide.

4. The method of preparing an alkali metal salt of a 2-alkoxy-3-carboxy-diphenyl which comprises saponifying an ester of 2-alkoxy-3-carboxy-diphenyl.

5. The method of preparing 2-alkoxy-3-carboxy-diphenyl from 2-hydroxy-3-carboxy-diphenyl which comprises esterifying 2-hydroxy-3-carboxy-diphenyl and alkylating the hydroxy group and then saponifying the ester.

6. A compound having the formula

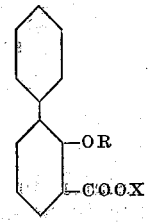

where X is hydrogen or an alkali metal and R is an ethyl, butyl, propyl or amyl group.

7. 2-ethoxy-3-carboxy-diphenyl.

8. An alkali metal salt of 2-ethoxy-3-carboxy diphenyl.

9. 2-n-butoxy-3-carboxy diphenyl.

WALTER G. CHRISTIANSEN.
ADELBERT W. HARVEY.